(No Model.)

D. MILLER.
VEHICLE BRAKE.

No. 497,805. Patented May 23, 1893.

Witnesses
Jas. K. McCathran
N. T. Riley

Inventor
David Miller
By his Attorneys,
C. A. Snow & Co.

UNITED STATES PATENT OFFICE.

DAVID MILLER, OF LIVINGSTON, NEW YORK.

VEHICLE-BRAKE.

SPECIFICATION forming part of Letters Patent No. 497,805, dated May 23, 1893.

Application filed January 10, 1893. Serial No. 457,920. (No model.)

*To all whom it may concern:*

Be it known that I, DAVID MILLER, a citizen of the United States, residing at Livingston, in the county of Columbia and State of New York, have invented a new and useful Vehicle-Brake, of which the following is a specification.

The invention relates to improvements in vehicle brakes.

The object of the present invention is to provide a simple and inexpensive vehicle-brake, which will be automatically applied when a vehicle is making a descent, and in which the wheels will be automatically relieved of the brake-shoes when the vehicle reaches a level surface.

The invention consists in the construction and novel combination and arrangement of parts hereinafter fully described, illustrated in the accompanying drawings and pointed out in the claims hereto appended.

Figure 1:
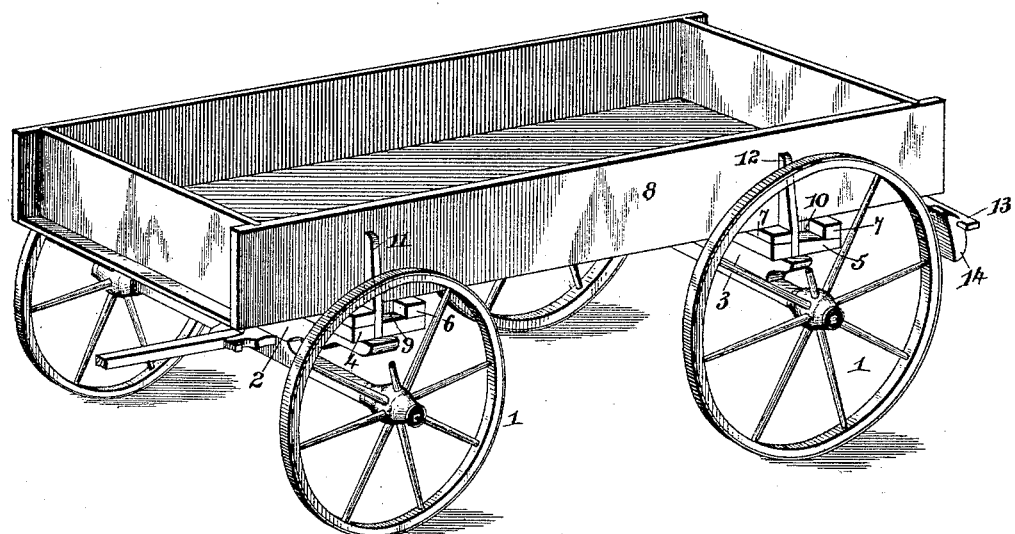
Figure 2:
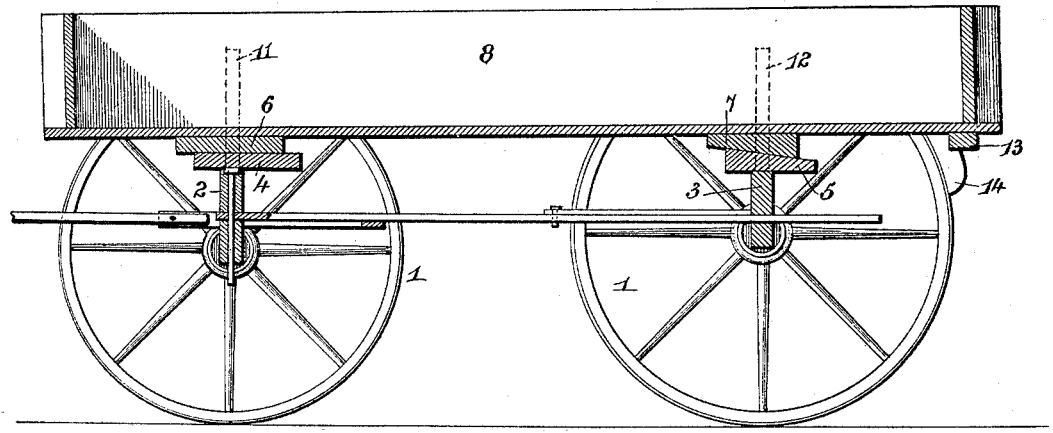
Figure 3:

In the drawings—Figure 1 is a perspective view of a vehicle provided with an automatic brake constructed in accordance with this invention. Fig. 2 is a longitudinal sectional view. Fig. 3 is a detail perspective view showing the upper and lower cross pieces.

Like numerals of reference indicate corresponding parts in all the figures of the drawings.

1 designates a running gear having secured to its front and rear bolsters 2 and 3 front and rear lower cross-pieces 4 and 5 upon which are arranged similar upper cross-pieces 6 and 7 of a body 8. The upper cross-pieces 6 and 7, which are secured to the body are provided in their ends with recesses 9 and 10 receiving the standards 11 and 12, whereby the upper cross-bars 6 and 7 are limited in their movement on the lower cross-pieces. The rear end of the vehicle has secured to it a brake-bar 13 carrying brake-shoes 14, and when the vehicle is descending a hill the weight of the body causes it to shift forward, the upper cross-bars moving on the lower ones, to carry the brake-shoes in engagement with the hind wheels, whereby the brake is applied.

In order to relieve the hind wheels of the brake-shoes after the vehicle has descended a hill and has reached level ground, the rear cross-pieces have their upper and lower faces inclined, whereby when the vehicle is on a level surface the weight of the body will move it rearward until the standards are at the front ends of the recesses of the upper cross-pieces. Both the upper and lower rear cross-pieces slant from front to rear at their meeting faces, in order that the upper face of the top cross-piece will always lie in a horizontal plane so that there will be no tendency to wrench the top cross-piece from the body of the vehicle.

It will be seen that the wagon brake is simple and inexpensive in construction, that it will be automatically applied when descending a hill, and that the wheels will be similarly released as soon as the vehicle reaches level ground.

Changes in the form, proportion and the minor details of construction may be resorted to without departing from the principle or sacrificing any of the advantages of this invention.

What I claim is—

1. The combination with a rear axle, its bolster, wheels, and standards rising therefrom, of a lower cross-piece 5 mounted on the bolster and having its upper face inclined downward from front to rear, a longitudinally movable body provided in rear of the wheels with brake-shoes for engaging the same, and a top cross-piece 7 secured to the body and arranged on the lower cross-piece and having its lower face inclined downward from front to rear and provided with recesses to receive the standards, whereby the longitudinal movement of the body is limited, substantially as described.

2. The combination with a running gear provided on its bolsters with front and rear cross-pieces the latter having its upper face inclined from front to rear, a longitudinally movable body provided in rear of the hind wheels with brake-shoes adapted to engage said wheels, and the front and rear cross-pieces secured to the body and provided at their ends with recesses to receive the standards of the running gear, the rear one of the top cross-pieces having its lower face inclined downward from front to rear and arranged on the inclined face of the bottom cross-piece, substantially as described.

In testimony that I claim the foregoing as my own I have hereto affixed my signature in the presence of two witnesses.

DAVID MILLER.

Witnesses:
JOHN H. SIGGERS,
E. G. SIGGERS.